United States Patent Office 3,434,924
Patented Mar. 25, 1969

3,434,924
METHOD OF POWER GENERATION AND THERMAL POWER PLANT FOR THE APPLICATION OF SAID METHOD
Pierre Pouderoux, Paris, France, assignor to Societe Stein et Roubaix, Paris, France
Filed Jan. 24, 1967, Ser. No. 611,343
Claims priority, application France, Feb. 3, 1966, 48,330
Int. Cl. G21d 7/00; F01d 15/00
U.S. Cl. 176—20                                7 Claims

ABSTRACT OF THE DISCLOSURE

A method of power generation which comprises circulating a primary heat-transporting fluid within a loop comprising a heat source, circulating a secondary heat-transporting fluid within another loop, effecting heat transfer between said primary and secondary heat-transporting fluids, circulating a vaporizable fluid within a utilization circuit in which said fluid is successively vaporized and superheated by heat exchange with said secondary fluid in a single pass process, then expanded and condensed, wherein independent variations of the flow rates of said primary fluid and said secondary fluid are admitted and the steam temperature is maintained at a constant value after vaporization and prior to superheating.

---

This invention is concerned with a method for the generation of power and is also directed to a thermal power plant which is designed for the utilization of said method. The thermal power plant of the type referred-to in this specification comprises a primary fluid circuit between a heat source and a heat exchanger, a secondary fluid circuit between said heat exchanger and a steam generator, and a utilization circuit through which is circulated a fluid (usually water) which vaporizes within said steam generator.

The invention is primarily applicable to power plants which utilize the heat generated in nuclear reactors of the type which are cooled by liquid metals. In order to prevent any contamination of the utilization circuit, these plants are accordingly provided with two loops for the circulation of heat-transporting fluid. The heat absorbed in the reactor by the liquid metal such as sodium which is circulated in the first loop is transferred to the steam generator by means of a secondary fluid which is circulated within the second loop. This secondary fluid also is usually a liquid metal such as, in particular, sodium or the eutectic sodium-potassium mixture.

The invention applies more specifically to thermal power plants as hereinabove described in which the steam generator is of the once-through type, that is to say without recirculation of water and without a steam separating drum, wherein water under pressure is admitted in the liquid state at one end of the generator and discharged at the other end in the form of superheated steam. The steam which is generated is usually expanded in either one or a plurality of power-generating turbines, then condensed and finally returned to the inlet of the steam generator.

The invention relates to a method of power generation which comprises circulating a primary heat-transporting fluid within a loop comprising a heat source, circulating a secondary heat-transporting fluid within another loop, effecting heat transfer between said primary and secondary heat-transporting fluids, circulating a vaporizable fluid within a utilization circuit in which there are successively caused to take place the vaporization of said fluid, the superheating of the fluid by heat transfer process with the secondary fluid in a single pass, then the expansion and condensation of said fluid, wherein said method permits of independent variation in the flow rates of said primary fluid and said secondary fluid and wherein the steam temperature is maintained at a constant value after vaporization and prior to superheating.

In other words, in order to ensure constancy in the value of the steam temperature prior to superheating while nevertheless retaining the possibility of regulation of the other parameters of conventional power plants, the invention utilizes to advantage the presence of the intermediate secondary fluid circuit which makes it possible, by regulating the flow of secondary fluid as and when variations occur in the load on the plant, to vary the temperature differences within the heat exchanger and within the steam generator so that the fluid flow rates do not remain proportional, thereby constituting an additional regulation factor.

The invention is also concerned with a thermal power plant comprising a primary fluid circuit between a heat source and a heat exchanger, a secondary fluid circuit between said heat exchanger and a steam generator and a utilization circuit through which is circulated a vaporizable fluid, said steam generator being of the once-through type and comprising at least one evaporator in which said vaporizable fluid vaporizes and a steam superheater, said plant additionally comprising means for the separate regulation of the flow of primary fluid and the flow of secondary fluid within said evaporator and means for maintaining the steam temperature at a constant value at the outlet of the evaporator by producing a variation in the flow rate of secondary fluid.

The essential advantage of the thermal power plant according to the invention as compared with conventional plants lies in the possibility of an optimum choice of materials employed in the construction of the steam generator as a function of operating temperatures. In fact, if the circulation of fluids takes place counter-currentwise (which is most frequently the case), the temperatures are lower within the evaporator than in the superheater. Inasmuch as the steam is maintained at a constant temperature at the evaporator outlet, any temperature rise within the evaporator is prevented whenever any reduction in power level occurs. As a consequence, ferrite steels in particular can be considered for use as suitable structural materials in the evaporator section. Although they are known to have lower creep strength and lower corrosion resistance at high temperatures in the presence of sodium than is the case with austenitic steels, ferritic steels nevertheless present distinctly greater advantages from an economic standpoint. Within the superheater section, temperatures are of a higher order and the use of austenitic steel remains necessary in this case. However, the vaporization process is always brought to completion at the level of the evaporator, so that the danger of corrosion which is attached to vaporization in the presence of austenitic steel in the event of faulty processing of the feedwater would thus no longer arise.

In one form of construction of the thermal power plant according to the invention, the utilization fluid circuit comprises in series at least a first turbine in which the superheated steam is expanded, a resuperheater disposed in the secondary fluid circuit in parallel with the superheater, a second turbine in which the resuperheated steam is expanded and a condenser for the expanded steam. In this case, the resuperheater is subjected to practically the same temperatures as the superheater and can be constructed of the same material.

A few particular forms of construction of the thermal power plant according to the invention will now be described below by way of example and not in any limiting sense, reference being had to the accompanying drawings, in which.

The different forms of construction described hereinafter are intended to be utilized for the production of power by means of the heat generated in a nuclear reactor which is cooled by circulation of liquid metal.

Figure 1:
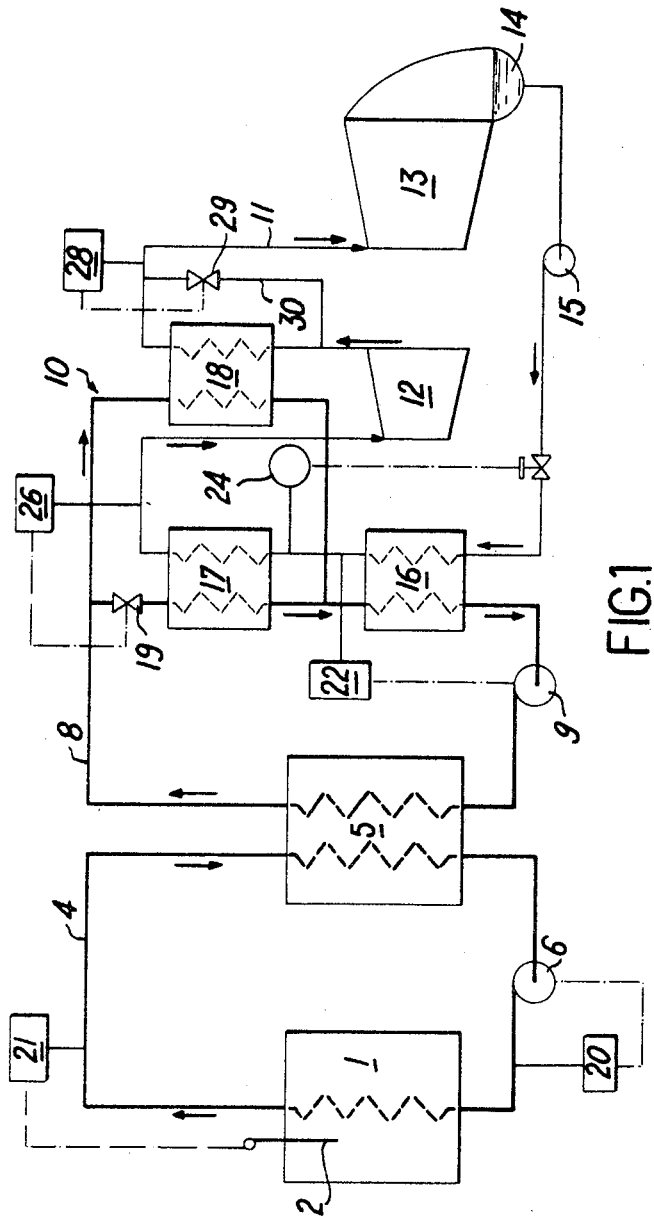
FIG. 1 shows diagrammatically a first form of construction of the power plant which operates as a "primary-control system"

The nuclear reactor referred-to is shown diagrammatically in FIG. 1 and designated by the reference 1. The reactivity, and consequently the quantity of heat produced by the reactor, is regulated by means of control rods 2.

The heat which is generated in the reactor is yielded to the coolant which consists of liquid sodium. The coolant flows through the primary circuit 4 between the reactor 1 and the intermediate heat exchanger 5. The circulation of sodium within this loop system is effected by a variable-delivery pump 6.

Within the heat exchanger 5, the primary circuit sodium yields its heat to a secondary fluid which also consists of liquid sodium in the particular case described and circulates within the secondary circuit 8. The hot sodium which passes out of the heat exchanger 5 is employed for the purpose of producing steam within the steam generator 10. The circulation of secondary sodium within the circuit 8 is effected by a variable-delivery pump 9.

The steam generator 10 receives water from the utilization circuit 11. Said utilization circuit additionally comprises two successive turbines 12 and 13 for causing the expansion of the steam which is generated, a condenser 14 for the expanded steam and a feed pump 15.

The steam generator 10 is essentially made up of three sections, namely an evaporator 16 which in fact represents the economizer-evaporator unit, a superheater 17 and a resuperheater 18. The hot secondary sodium which passes out of the heat exchanger 5 is divided into two streams, the flow rates of which are regulated by the valve 19 and which supply heat respectively to the superheater 17 and the resuperheater 18. The two streams then unite so as to heat the evaporator 16.

The steam which is produced in the evaporator 16 and superheated at 17, then expanded in the turbine 12 is resuperheated within the resuperheater 18 prior to further expansion within the turbine 13.

The plant of FIG. 1 operates as a "primary-control system," which is understood to mean that the reactivity of the reactor 1 is regulated as a function of the load on the turbines 12 and 13.

In nuclear power plants, it is useful to maintain the temperatures of the coolant at a constant value both at the inlet and outlet of the reactor. For this purpose, the plant comprises in the primary circuit 4 a temperature regulator 20 which is located upstream of the reactor and which serves to maintain the minimum temperature of the primary sodium at a constant value by modifying the output of the pump 6, and another temperature regulator 21 which is located downstream of the reactor and the function of which is to maintain the maximum temperature of the primary sodium at a constant value by producing action on the drive mechanism of the control rods 2.

In the utilization circuit 2, the temperature of the water which is fed to the steam generator 10 is maintained constant in the usual manner by modifying the rate of delivery of resuperheaters (not shown).

In accordance with the invention, a temperature regulator 22 is placed in the steam circuit immediately at the outlet of the evaporator 16. Said regulator serves to maintain the point at which the water vaporization is completed or, more specifically, to maintain constant the temperature at which the steam is in a very slightly superheated state (5 to 10° C., for example) and which is obtained at the outlet of the evaporator. In the form of construction of FIG. 1, the regulator 22 acts on the flow rate of secondary sodium which is transferred by the pump 9.

A pressure regulator 24 is also provided in the steam circuit at the outlet of the evaporator 16, and serves to maintain constant steam pressure at this point by modifying the flow rate of feedwater.

A temperature regulator 26 serves to maintain constant the temperature of the superheated steam as it passes out of the superheater 17. Said regulator is adapted to actuate the valve 19 which controls the distribution of the total flow of secondary sodium between the superheater 17 and the resuperheater 18.

Finally, the temperature of the resuperheated steam which is fed to the turbine 13 is also maintained at a constant value by a temperature regulator 28. As shown in FIG. 1, said regulator 28 actuates a valve 29 which controls the flow of desuperheated steam which passes into a by-pass duct 30 of the resuperheater 18.

In accordance with an alternative form which makes it possible to dispense with the desuperheating stage, the regulator 28 can control the flow of secondary sodium through an additional by-pass duct which dispenses with the need of both the superheater 17 and the superheater 18.

The regulation of the steam temperature at the outlet of the evaporator (in addition to the regulation of the superheated steam) is permitted by the presence of the secondary sodium circuit. The flow of secondary sodium can in fact be subjected to variations which are not proportional to the variations in the flow of primary sodium. Consequently, it is possible to vary as a function of the power level the temperature differences between fluids which pass on the one hand through the intermediate heat exchanger and, on the other hand, through the evaporator and economizer unit.

Figure 2:
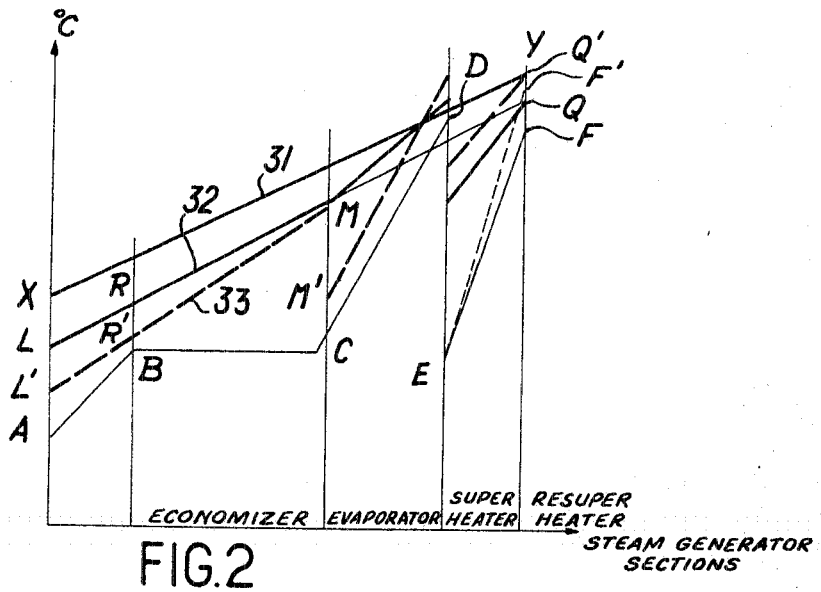
FIG. 2 shows the temperature variations of fluids during heat transfer processes in the case of two different power levels (reactivity values)
Figure 3:
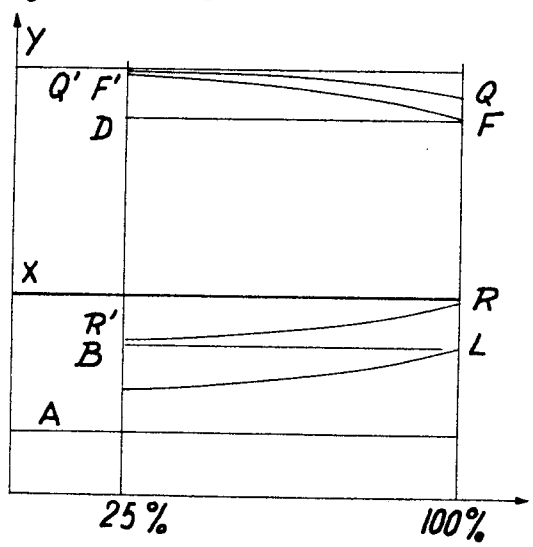
FIG. 3 shows the progressive variation of temperatures as a function of the variations in power level (reactivity)

The corresponding progressive variation of temperature is represented by means of the graphs of FIGS. 2 and 3. These figures relate to a power plant as shown in FIG. 1 so far as concerns the regulation of steam temperature at the outlet of the evaporator and the regulation of superheated steam temperature, but without any temperature regulation in the case of resuperheated steam.

FIG. 2 represents the temperature variations of the different fluids as a function of the heat transferred in respect of two different power levels: the curves which relate to the normal power level of the reactor are shown in full lines and the curves which relate to a low power level (such as 0.25, for example) appear in broken lines.

The curves 31, 32, 33 correspond respectively to the primary sodium, the secondary sodium and to the steam. The vertical lines delimit the different steam generator sections considered in sequence, namely the economizer, evaporator, superheater and resuperheater.

FIG. 3 represents as a function of the power level the temperature variations of the different fluids at the principal points of the plant. The same temperatures are designated by the same references as in FIG. 2. At the time of reductions in reactivity or power level of the reactor, a regulation of the total flow of secondary sodium (reduction in the ratio of the flow of secondary sodium to the flow of primary sodium) results in a reduction of the logarithmic value $\Delta t$:

On the one hand, within the intermediate heat exchanger by virtue of the reduction in the difference in hot temperatures, in which case YQ becomes YQ' in FIGS. 2 and 3; and On the other hand, within the economizer-evaporator unit by virtue of the reduction in the temperature differences at the point of constriction, in which case RB becomes R'B.

Also in the superheater, the logarithmic value $\Delta t$ decreases as a result of a reduction in the fraction of the secondary sodium flow which passes through the superheater, in which case the difference between the cold temperature of this fraction and the steam temperature at the superheater inlet decreases from MC to M'C.

Under these conditions, if no provision is made for a by-pass off the resuperheater and if the temperature of the steam at the inlet of this latter is constant (point E), the temperature of the resuperheated steam increases from F to F'.

Figure 4:
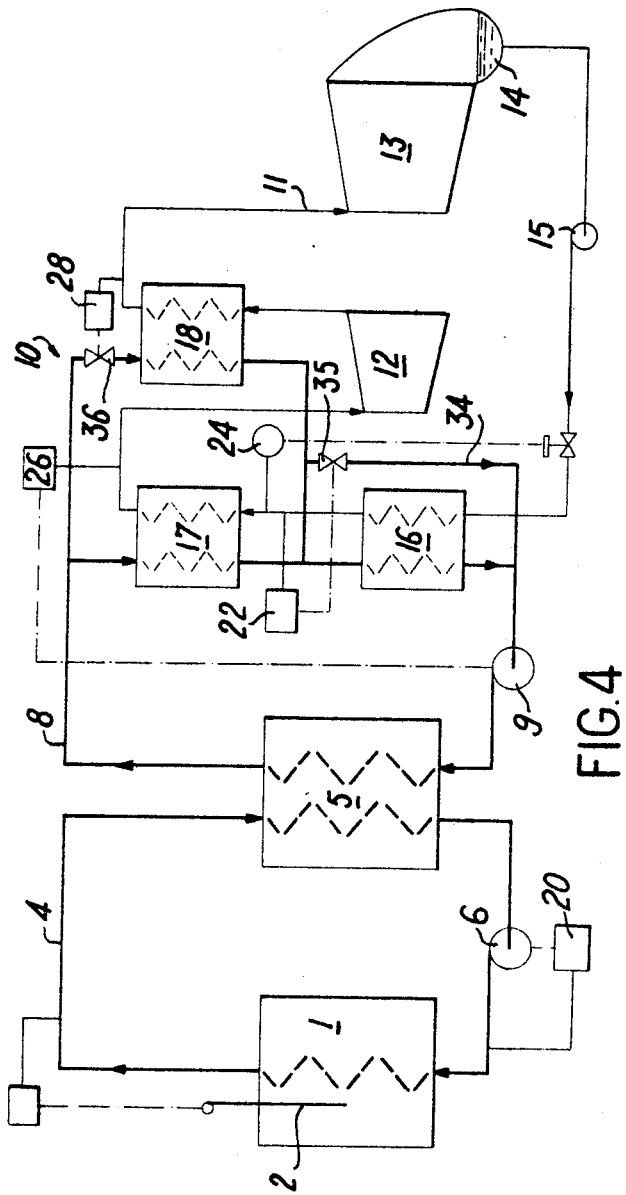
FIG. 4 shows an alternative form of construction of the power plant of FIG. 1.

FIG. 4 illustrates an alternative form of construction of the plant which has been described in the foregoing. There again appear in this figure the same sodium circuits 4 and 8 and the same steam generator 10. However, no provision is made in this embodiment for a resuperheater. On the other hand, the secondary sodium circuit 8 comprises an additional by-pass duct 34 which dispenses with the need for the evaporator 16. The duct 34 referred to is fitted with a valve 35 for the purpose of regulating the flow rate of secondary sodium which is circulated therein.

As appears from FIG. 4, the temperatures of the sodium of the primary circuit 4 both at the inlet and at the outlet of the reactor 1 are maintained constant in this case also by modifying both the positions of the control rods 2 and the output of the primary sodium pump 6.

Furthermore, the regulator 26 which serves to maintain the steam temperature at a constant value at the outlet of the superheater 17 modifies the output of the secondary sodium pump 9. The temperature of the resuperheated steam is maintained constant by the regulator 28 which actuates a valve 36 and this latter controls the distribution of the secondary sodium between the superheater 17 and the resuperheater 18.

The temperature of the steam at the outlet of the evaporator 16 is maintained constant by operating the valve 35, thus regulating the flow of secondary sodium which is conveyed through the by-pass duct 34 of the evaporator. Finally, the pressure of said steam at the outlet of the evaporator 16 is regulated to a constant value by modifying the feedwater flow rate.

In this case, the progressive variation of temperatures of the different fluids as a function of the load on the plant is different from that of FIGS. 2 and 3. However, the possibility of maintaining constant both the temperature of the steam at the outlet of the evaporator, the temperaure of the superheated steam and the temperature of the resuperheated steam again results from the variations in temperature differences between fluids as and when variations occur in the power level.

The flow rate of secondary sodium increases with respect to the flow rate of primary sodium when the power level falls off. The reduction of the logarithmic value $\Delta t$ of the intermediate heat exchanger results from a reduction in the difference XL between the cold temperature of the primary sodium and the cold temperature of the secondary sodium. The reduction of the logarithmic value $\Delta t$ of the superheater results on the contrary from the reduction in temperature difference between the superheated steam and the cold sodium which is admitted into the superheater. The same applies to the resuperheater. Finally, the diversion of part of the sodium at the level of the evaporator-economizer unit has the effect of reducing the temperature difference at the point of constriction.

Figure 5:
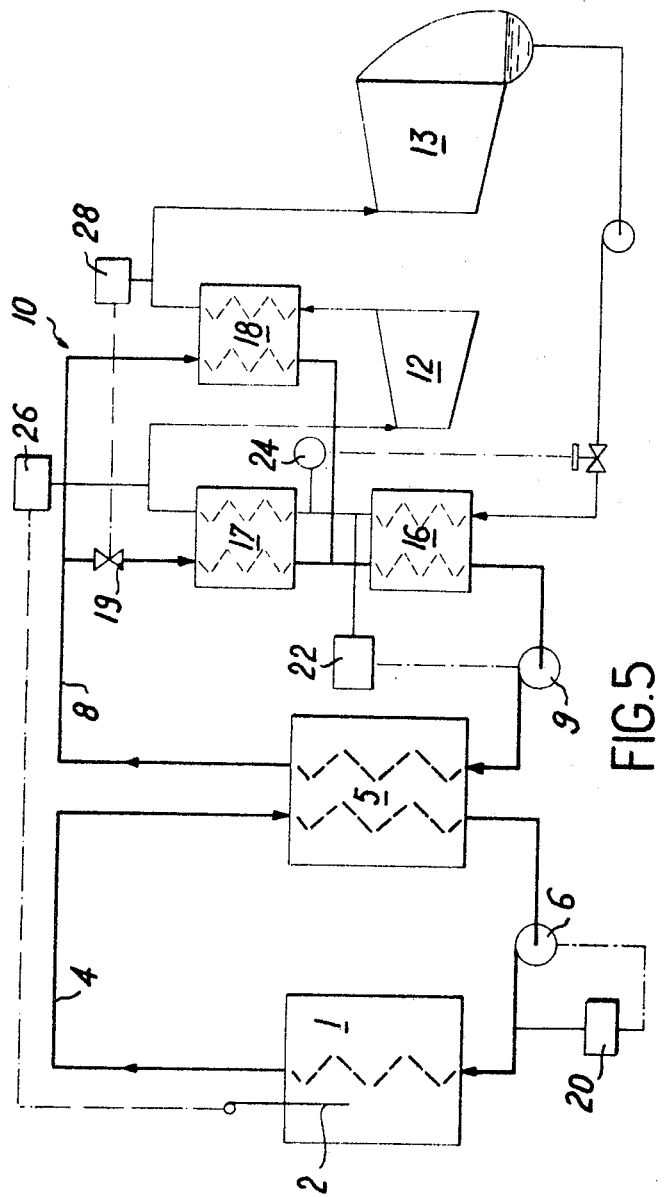
FIG. 5 shows schematically another embodiment which operates as a primary-control system and in which the temperature of the primary circuit fluid at the outlet of the reactor is variable.

Referring now to FIG. 5, there will now be described another form of construction of the plant according to the invention which has the advantage of requiring a smaller number of regulating devices in the liquid sodium circuits.

This form of construction can be utilized whenever it is possible to permit a slight variation in temperature of the primary circuit sodium at the reactor outlet, for example, whilst the temperature of the sodium at the reactor inlet remains constant.

The plant shown in FIG. 5 comprises the same fluid circuits as the plant of FIG. 1 and differs therefrom only in the regulating system employed, which accordingly comprises:

A temperature regulator 20 disposed in the primary sodium circuit 4 at the inlet of the reactor 1 and adapted to modify the output of the pump 6;

A temperature regulator 22 disposed in the steam circuit at the outlet of the evaporator and adapted to modify the output of the secondary sodium pump 9;

A regulator 24 which is adapted to regulate the steam pressure at the outlet of the evaporator 16 and which controls the flow rate of feedwater; and Finally, a temperature regulator 28 disposed in the steam circuit at the outlet of the resuperheater 18 and adapted to modify the flow distribution of secondary sodium between the superheater and the resuperheater by means of the valve 19.

This form of construction accordingly makes it possible to dispense with desuperheating of the resuperheated steam as contemplated in the system of FIG. 1, without thereby adding a by-pass duct with flow-regulating means in the secondary sodium circuit.

At the time of a decrease in the power level, the flow rate of secondary sodium is reduced with respect to the flow rate of primary sodium and the reduction of the logarithmic value $\Delta t$ in the intermediate heat exchanger results from a reduction of the difference in hot temperatures (admission of primary sodium and discharge of secondary sodium). However, these temperatures decrease and, in this case, the points Y and Q of FIG. 2 would fall at the same time as L. Furthermore, the combined action on the secondary sodium flow rate makes it possible to reduce the difference in hot temperatures of the superheater and of the resuperheater as well as the temperature difference at the point of constriction of the evaporator.

The different arrangements described above relate to thermal power plants which operate as "primary-control systems," wherein the reactivity of the reactor is regulated as a function of the load on the turbines, the load being adjusted to a reference value (by modifying the steam flow). The arrangements referred-to can nevertheless be readily adapted to plants which operate on the "primary-control reactor" principle, that is to say the principle of power-output control on which the reactivity of the reactor is adjusted to a reference value (by the positioning of the control rods) and the regulation of steam pressure modifies the flow of steam which is admitted into the turbine 12.

Figure 6:
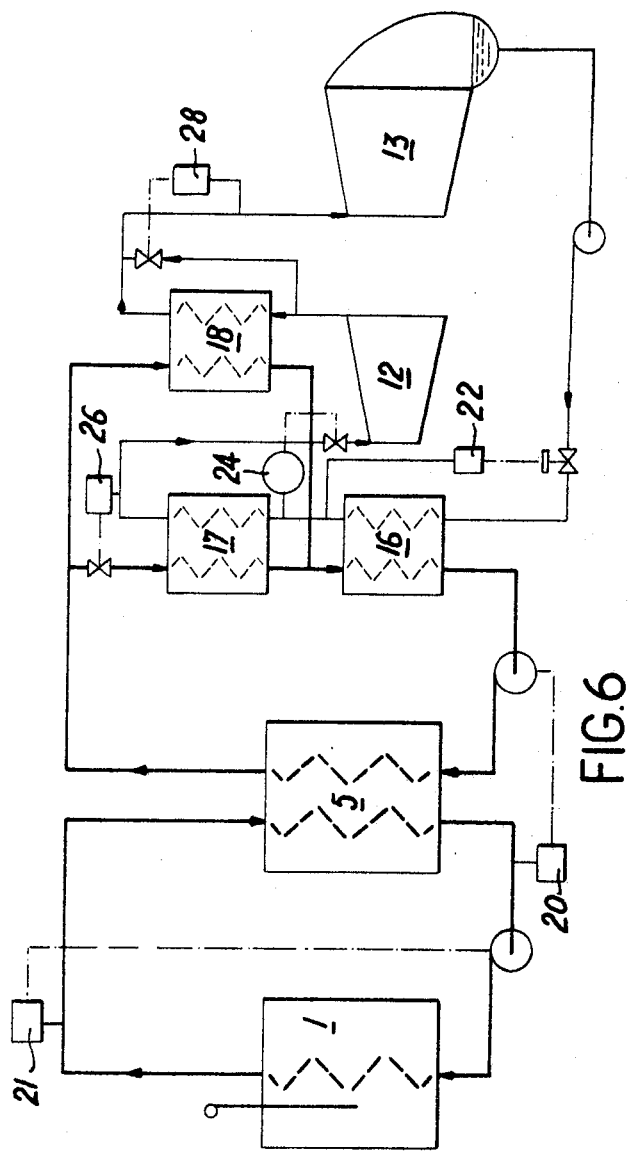
FIG. 6 illustrates an alternative form of construction of the plant in the case of "primary-control reactor" operation.

FIG. 6 shows by way of example the modifications which can be made in the arrangement of FIG. 1 in order to adapt the system to the "primary-control reactor" mode of operation. However, it is readily apparent that similar modifications could be applied especially to the form of construction of FIG. 5.

In accordance with FIG. 6:

The regulator 21 which serves to maintain the temperature of the primary sodium at a constant value at the outlet of the reactor 1 is adapted to produce action on the primary sodium pump 6;

The regulator 20 which serves to regulate the primary sodium temperature at the inlet of the reactor is adapted to produce action on the secondary sodium pump 9;

The regulator 22 which serves to regulate the temperature of the steam at the outlet of the evaporator 16 is adapted to modify the flow rate of feedwater;

The regulator 26 which serves to regulate the temperature of the superheated steam is adapted to produce action, without modification, on the distribution of secondary sodium between the superheater and the resuperheater;

The regulator 24 which serves to regulate the pressure of the steam at the outlet of the evaporator is adapted to control the flow of steam which is admitted into the turbine 12; and The temperature of the resuperheated steam remains constant by virtue of a desuperheating stage.

It will be readily understood that the invention is not limited in any sense to the particular forms of execution which have been described above solely by way of example but extends, on the contrary, to any or all alternative forms. It would be feasible in particular, without thereby departing from the scope of the invention, to utilize a temperature regulation which no longer produces action directly on the flow rate of secondary sodium but rather on the ratio of the flow rate of secondary fluid to the flow rate of primary fluid.

What I claim is:

1. A method of power generation which comprises circulating a primary heat transporting fluid within a loop-including a nuclear reactor heat source, maintaining constant the temperature of the primary fluid upstream of the source by varying the flow of primary fluid, circulating by temperature controlled pump means a secondary heat transfer fluid within another loop, effecting heat transfer between said primary and secondary heat transporting fluids, circulating a vaporizable fluid within a utilization circuit, including pressure responsive valve means, vaporizing and superheating said fluid by heat transfer with the secondary fluid in a single pass, then expanding and condensing said fluid, maintaining the steam temperature constant after vaporization and prior to superheating by changing the flow rate of the pump means by the steam temperature after vaporizing and prior to superheating and maintaining constant the steam pressure at the outlet of the evaporator by changing the flow of the utilization fluid through the valve means by the steam pressure after vaporizing and prior to superheating.

2. A thermal power plant comprising a primary fluid circuit between a nuclear reactor heat source and a heat exchanger, a secondary fluid circuit between said heat exchanger and a steam generator and a utilization circuit through which is circulated a vaporizable fluid, said steam generator being of the once-through type and comprising at least one evaporator in which said vaporizable fluid vaporizes and a steam superheater, temperature responsive pump means for maintaining constant the temperature of the primary fluid upstream of the source by varying the flow of primary fluid, pump means for the separate regulation of the flow of secondary fluid within said evaporator, temperature responsive means responsive to temperature of the steam at the outlet of the evaporator for maintaining constant the steam temperature at the outlet of the evaporator by changing the flow rate of said pump means and pressure responsive valve means responsive to the steam pressure at the outlet of the evaporator for maintaining constant the steam pressure at the outlet of the evaporator by changing the flow rate of the utilization fluid through said valve means.

3. A thermal power plant as described in claim 2 including temperature responsive means for maintaining constant the temperature of the superheated steam by regulating the heat generated by said source.

4. A thermal power plant as described in claim 2 including temperature responsive means for maintaining constant the temperature of the superheated steam by regulating the flow of secondary fluid.

5. A thermal power plant as described in claim 2 including by-pass means for maintaining constant the temperature of primary fluid at the outlet of the heat source by regulating the flow rate of secondary fluid around the steam generator.

6. A thermal power plant as described in claim 2 including a resuperheater and means for maintaining constant the temperature of the resuperheated steam by regulating the flow of secondary fluid between the superheater and the resuperheater.

7. A thermal power plant as described in claim 2 including a resuperheater, a by-pass around said resuperheater and means for maintaining constant the temperature of the resuperheated steam by regulating the flow of steam by-passing the resuperheater.

References Cited

UNITED STATES PATENTS

| | | | |
|---|---|---|---|
| 2,841,545 | 7/1958 | Zinn | 176—40 X |
| 3,253,994 | 5/1966 | Kagi | 176—65 X |
| 3,247,069 | 4/1966 | Powell et al. | 176—55 X |

FOREIGN PATENTS

| | | |
|---|---|---|
| 846,996 | 9/1960 | Great Britain. |
| 1,444,129 | 5/1966 | France. |

OTHER REFERENCES

S. Levy et al., Advanced Design of a Sodium Cooled Thermal Reactor for Power Production, vol. 9, part 2, second United Nations Int. Conf. on Peaceful Uses of Atomic Energy, 1958, pp. 148, 149, 151, 154, 155, 156.

R. L. Olson et al., the Sodium Graphite Reactor Power Plant for CPPD, vol. 9, part 2 of above publication, pp. 169, 170, 171, 172, 174.

C. Starr et al., vol. 6 of Third Int. Conf. of above (1965), page 294.

REUBEN EPSTEIN, *Primary Examiner.*

U.S. Cl. X.R.

60—104; 176—22, 24, 40, 65